United States Patent
Ning et al.

(10) Patent No.: US 11,440,842 B2
(45) Date of Patent: Sep. 13, 2022

(54) METHOD FOR PREPARING A CEMENTING MATERIAL USING SMELTING INDUSTRIAL WASTE SLAG AFTER UTILIZING THE SIMULTANEOUS REMOVAL OF S02 AND NOX IN FLUE GAS AND APPLICATION OF THE CEMENTING MATERIAL OBTAINED BY THE SAME

(71) Applicant: KUNMING UNIVERSITY OF SCIENCE AND TECHNOLOGY, Yunnan (CN)

(72) Inventors: Ping Ning, Yunnan (CN); Jiacheng Bao, Yunnan (CN); Xin Sun, Yunnan (CN); Yansu Luo, Yunnan (CN); Kai Li, Yunnan (CN); Chi Wang, Yunnan (CN)

(73) Assignee: KUNMING UNIVERSITY OF SCIENCE AND TECHNOLOGY, Yunnan (CN)

( * ) Notice: Subject to any disclaimer, the term of this patent is extended or adjusted under 35 U.S.C. 154(b) by 97 days.

(21) Appl. No.: 16/897,447

(22) Filed: Jun. 10, 2020

(65) Prior Publication Data
US 2021/0331974 A1     Oct. 28, 2021

(30) Foreign Application Priority Data
Apr. 23, 2020 (CN) .......................... 202010327169.3

(51) Int. Cl.
*C04B 18/14*    (2006.01)
*C04B 41/53*    (2006.01)
(Continued)

(52) U.S. Cl.
CPC ............ *C04B 18/144* (2013.01); *B01D 53/80* (2013.01); *C04B 7/17* (2013.01); *C04B 7/36* (2013.01);
(Continued)

(58) Field of Classification Search
CPC ......... C04B 18/144; C04B 41/53; C04B 5/06; C04B 7/17; C04B 7/36; C04B 7/147;
(Continued)

(56) References Cited

U.S. PATENT DOCUMENTS 5,164,167 A * 11/1992 Chang .................... B01D 53/60
423/235

FOREIGN PATENT DOCUMENTS

CN    102824844 A * 12/2012
CN    105771632 A * 7/2016
(Continued)

OTHER PUBLICATIONS

CN-105771632-A Su et al machine translation (Year: 2016).*
(Continued)

*Primary Examiner* — Kevin E Yoon
*Assistant Examiner* — Marites A Guino-O Uzzle
(74) *Attorney, Agent, or Firm* — Hunton Andrews Kurth LLP

(57) ABSTRACT

The invention belongs to the technical field of the resource treatment of industrial wastes, and particularly relates to a method for preparing a cementing material using smelting industrial waste slag after utilizing the simultaneous removal of $SO_2$ and $NO_x$ in flue gas and an application of the cementing material obtained by the same. According to the invention, $SO_2$ and $NO_x$ in the flue gas can be treated with the smelting industrial waste slag, meeting requirement of flue gas desulfurization and denitration; moreover, the smelting industrial waste slag can be purified and separated by means of waste gas resources to obtain a cementing material, realizing the resource utilization of the smelting industrial waste slag and waste gas.

8 Claims, 2 Drawing Sheets

(51) Int. Cl.
  *C04B 7/17* (2006.01)
  *B01D 53/80* (2006.01)
  *C04B 7/36* (2006.01)
  *C22B 7/04* (2006.01)
  *B01D 53/60* (2006.01)
  *C04B 5/06* (2006.01)
  *C04B 7/147* (2006.01)

(52) U.S. Cl.
  CPC ............... *C04B 41/53* (2013.01); *C22B 7/04* (2013.01); *B01D 53/60* (2013.01); *B01D 2258/0283* (2013.01); *C04B 5/06* (2013.01); *C04B 7/147* (2013.01)

(58) Field of Classification Search
  CPC ....... C04B 28/08; C04B 18/067; C04B 18/14; B01D 53/60; B01D 2258/0283; B01D 2255/2073; B01D 255/20738; B01D 53/80; B01D 2251/304; B01D 2251/404; B01D 2251/602; B01D 2251/606; B01D 2255/20738; B01D 2255/20761; B01D 2257/302; B01D 2257/404; C22B 7/04; C22B 7/007; C22B 47/00; Y02A 50/20; Y02P 10/20; Y02P 40/10; Y02W 30/91; C21B 15/00

See application file for complete search history.

(56) References Cited

FOREIGN PATENT DOCUMENTS

| | | | |
|---|---|---|---|
| CN | 106731629 A | * | 5/2017 |
| CN | 107812441 A | * | 3/2018 |

OTHER PUBLICATIONS

CN-106731629-A Tao et al machine translation (Year: 2017).*
CN-107812441-A Tong machine translation (Year: 2018).*
CN-102824844-A, '844 machine translation (Year: 2019).*
Ziheng Meng, Chenye Wang, Xingrui Wang, Yan Chen, and Huiquan Li Energy & Fuels 2018 32 (2), 2028-2036 DOI: 10.1021/acs.energyfuels.7b03385 (Year: 2018).*

* cited by examiner

METHOD FOR PREPARING A CEMENTING MATERIAL USING SMELTING INDUSTRIAL WASTE SLAG AFTER UTILIZING THE SIMULTANEOUS REMOVAL OF S02 AND NOX IN FLUE GAS AND APPLICATION OF THE CEMENTING MATERIAL OBTAINED BY THE SAME

CROSS REFERENCE TO RELATED APPLICATION

This application claims the priority of Chinese Patent Application No. 202010327169.3, filed on Apr. 23, 2020, entitled "Method for preparing a cementing material using smelting industrial waste slag after utilizing the simultaneous removal of $SO_2$ and $NO_x$ in flue gas and application of the cementing material obtained by the same", which is incorporated herein by reference in its entirety.

TECHNICAL FIELD

The present invention belongs to the technical field of resource treatment of industrial wastes, and particularly relates to a method for preparing a cementing material using smelting industrial waste slag after utilizing the simultaneous removal of $SO_2$ and $NO_x$ in flue gas and application of the cementing material obtained by the same.

BACKGROUND ART $SO_2$ and $NO_x$ are the main pollutants released in the non-ferrous metal smelting process, which are the main causes for environmental problems such as acid rain, photochemical smog and greenhouse effect, and so on, seriously threatening the living environment and health of human beings. At present, the mature technology for simultaneously treating $SO_2$ and nitrogen oxide ($NO_x$) mainly includes the combination of the use of wet flue gas desulfurization (WFGD) and selective catalytic reduction (SCR) technology, which have high desulfurization and denitration efficiency, stable operation, while have large water consumption and relatively high cost in the investment and the operation. Therefore, there is an urgent need in non-ferrous metal smelting industry for a new technology of simultaneous desulfurization and denitration of flue gas with low cost and simple process.

Ore slurry desulfurization is a technology which is capable of removing $SO_2$ from flue gas by liquid phase catalytic oxidation of $SO_2$ to form $SO_4^{2-}$ by using a lot of metal oxides and metal ions in ore slurry. However, since the solubility of NO in the ore slurry is very low, it is still worthwhile to further study how to convert NO into more soluble N-species (including $NO_2$, $N_2O_4$, $N_2O_5$), thus removing $NO_x$ into liquid phase of ore slurry while controlling the $SO_2$ emission.

A large amount of iron-manganese alloy slag and copper smelting slag would be produced in the iron-manganese alloy and copper smelting industries. The XRD and XRF techniques were carried out on iron-manganese alloy slag and copper smelting slag to characterize the mineral phase and chemical composition, respectively. The results showed that the content of $SiO_2$, CaO, MgO and $Al_2O_3$ in two slags can reach 30-40%, 20-30%, 5-10% and 8-10% respectively. Meanwhile, the phase of MnS, FeS, MnO, $Fe_3O_4$, silicate and the like were also existed in two slags. That is, the slags are solid wastes containing high calcium, magnesium and aluminum. At present, the method for treating said solid wastes is mainly to use them as an admixture only for preparing high-performance concrete.

SUMMARY OF THE INVENTION

In view of this, an object of the present invention is to provide a method for preparing a cementing material using smelting industrial waste slag after utilizing the simultaneous removal of $SO_2$ and $NO_x$ in flue gas, which can perform simultaneously desulfurization and denitration treatment of flue gas by adequately utilizing smelting industrial waste slag containing high calcium, magnesium and aluminum to finally obtain the cementing material with high hydration activity to realize high-efficiency utilization of the industrial waste. The present invention also provides an application of the cementing material obtained by the method according to the invention.

In order to achieve the above object, the present invention provides the following technical scheme:

The present invention provides a method for preparing a cementing material using smelting industrial waste slag after utilizing the simultaneous removal of $SO_2$ and $NO_x$ in flue gas, comprising the following steps:

mixing the smelting industrial waste slag with a phase regulator to form a mixture, and then performing thermal activation pretreatment on the mixture to obtain an activated slag;

mixing the activated slag, an oxidant and water to obtain the slurry for desulfurization and denitration;

contacting the slurry with flue gas to be treated such that the flue gas is subjected to the simultaneously desulfurization and denitration treatment to obtain a slurry containing sulfate and nitrate;

performing solid-liquid separation on the slurry containing sulfate and nitrate to obtain a solid phase and a liquid phase; and drying the solid phase to obtain the cementing material.

Preferably, the smelting industrial waste slag comprises ferromanganese alloy slag and/or copper smelting slag, and the phase regulator is CaO, $Na_2CO_3$ or $B_2O_3$.

Preferably, the mass ratio of the smelting industrial waste slag to the phase regulator is 10:(1-3).

Preferably, the thermal activation pretreatment comprises: sequentially performing first grinding, roasting and second grinding on the mixture, wherein the roasting temperature is 800-1200° C., and the roasting time is 60-180 minutes, and wherein the products obtained by the first grinding and the second grinding each independently has a particle size of 200-300 mesh.

Preferably, the oxidant comprises $KMnO_4$ or $NaClO_2$.

Preferably, the mass ratio of the activated slag to the oxidant is 10:(0.3-0.8), and the concentration of activated slag in the slurry is 50 g/L.

Preferably, the volume concentration of $SO_2$, NO and $O_2$ in the flue gas each is 300-1000 ppm, 200-500 ppm and 1-10%, and the flow rate of the flue gas is 200-800 mL/min.

Preferably, the volume ratio of the slurry to the flue gas in the desulfurization and denitration treatment is 1:(600-1000), and the temperature of the desulfurization and denitration treatment is 30-45° C., and the time of the treatment is 5-12 h.

Preferably, the post-treatment of the liquid phase comprises sequential impurity removal and concentration.

Furthermore, the present invention provides an application of the cementing material obtained by the method described in above technical schemes as a building material in the building field.

The present invention provides a method for preparing a cementing material using smelting industrial waste slag after utilizing the simultaneous removal of $SO_2$ and $NO_x$ in flue gas, comprising the following steps: mixing the smelting industrial waste slag with a phase regulator, and then performing thermal activation pretreatment on the resulting mixtures to obtain activated slag; mixing the activated slag, an oxidant and water to obtain the slurry for desulfurization and denitration; contacting the slurry with flue gas to be treated, thereby performing simultaneously desulfurization and denitration treatment on the flue gas to obtain a slurry containing sulfate and nitrate; performing solid-liquid separation on the slurry containing sulfate and nitrate to obtain a solid phase and a liquid phase; and drying the solid phase to obtain the cementing material.

According to the present invention, the smelting industrial waste slag is initially subjected to thermal activation pretreatment, so as to convert the phase MnS or FeS and fayalite in the original slag into manganese oxides or iron oxides in a large amount, the manganese oxides and iron oxides being able to react with $SO_2$ and $NO_x$ in desulfurization and denitration treatment to generate a water-soluble sulfate and nitrate. In short, thermal activation pretreatment can not only improve the removal rate of $SO_2$ and $NO_x$, but also leaching excess manganese and iron from the slag by utilizing the strong reducibility of $SO_2$ and $NO_x$ as well as the sulfate and nitrate generated in the product, thereby improving the hydration activity of the slag and facilitating the preparation of the cementing material. According to the present invention, the smelting waste slag generated in the metal smelting industry could be used to treat $SO_2$ and $NO_x$ in the smelting industrial waste gas, meeting the requirements in terms of low cost and high efficiency of the desulfurization and denitration of the flue gas in the metal smelting industry; further, the smelting industrial waste slag can be purified and separated by means of waste gas resources to obtain a cementing material, realizing the resource utilization of the smelting industrial waste slag and waste gas.

DETAILED DESCRIPTION OF THE EMBODIMENTS

Figure 1:
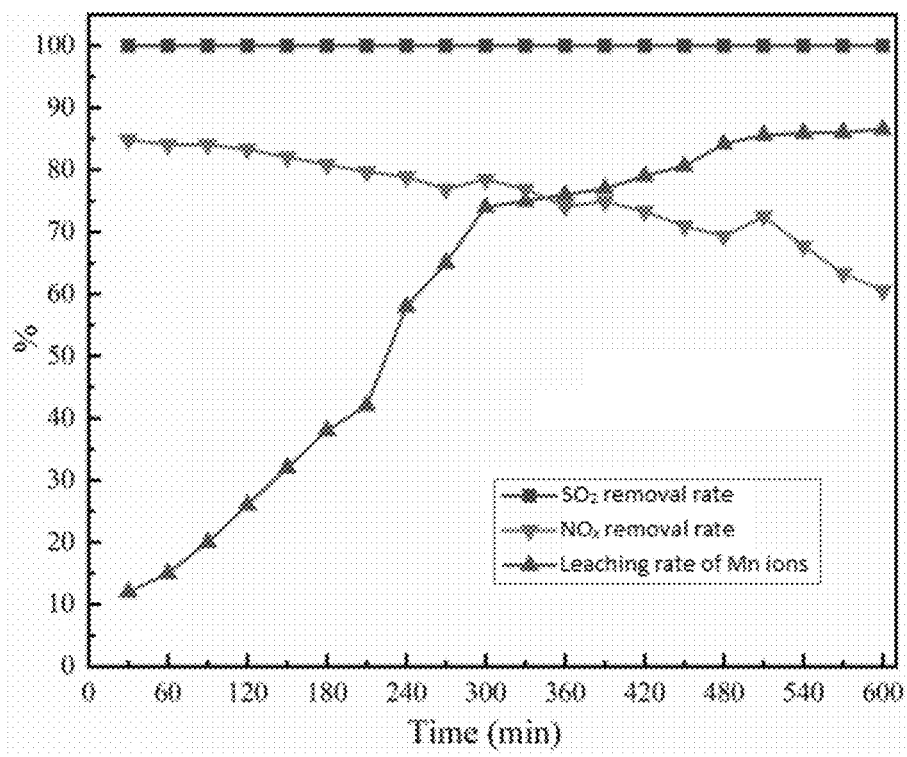
FIG. 1 is a graph showing the test results of the desulfurization and denitration treatment in Example 1.

The present invention provides a method for preparing a cementing material using smelting industrial waste slag after utilizing the simultaneous removal of $SO_2$ and $NO_x$ in flue gas, comprising the following steps:

mixing the smelting industrial waste slag with a phase regulator to form a mixture, and then performing thermal activation pretreatment on the mixture to obtain an activated slag;

mixing the activated slag, an oxidant and water to obtain the slurry for desulfurization and denitration;

contacting the slurry with flue gas to be treated such that the flue gas is subjected to the simultaneously desulfurization and denitration treatment to obtain a slurry containing sulfate and nitrate;

performing solid-liquid separation on the slurry containing sulfate and nitrate to obtain a solid phase and a liquid phase; and drying the solid phase to obtain the cementing material.

According to the present invention, the smelting industrial waste slag and the phase regulator are mixed and then subjected to thermal activation pretreatment to obtain an activated slag.

In the present invention, the smelting industrial slag is preferably a metal smelting industrial slag, and more preferably includes a ferromanganese alloy slag and/or a copper smelting slag. In the present invention, the phase regulator is preferably CaO, $Na_2CO_3$ or $B_2O_3$. In the present invention, the mass ratio of the smelting industrial waste slag to the phase regulator is preferably 10:(1-3). The main composition of the smelting industrial slag preferably includes manganese alloy slag and/or copper alloy slag. In the present invention, if the smelting industrial slag includes a manganese alloy slag and a copper alloy slag, the mass ratio of the manganese alloy slag to the copper smelting slag is preferably ≥2.

In the present invention, the thermal activation pretreatment preferably comprises: sequentially performing first grinding, roasting and second grinding on the mixture. In the present invention, the roasting temperature is preferably 800-1200° C., and more preferably 900-1100° C., and the roasting time is preferably 60-180 minutes, and more preferably 80-160 minutes. In the present invention, the roasting temperature is preferably obtained by raising the room temperature, and the raising temperature rate is preferably 5-10° C./min, and more preferably 6-9° C./min. In the present invention, the apparatus for roasting is preferably a muffle furnace. The products obtained by the first grinding and the second grinding each independently has a particle size preferably of 200-300 mesh. In the present invention, there is no particular limitation to the first grinding and the second grinding, and any means for grinding which is well known to those skilled in the art can be used. In the present invention, the second grinding is preferably performed after cooling the roasted product.

In the present invention, under the function of the phase regulator and heat excitation, the low-activity phase MnS with the content of up to 8-10 wt. % comprised in the raw material phase of the smelting industrial waste slag could be converted into manganese oxide, and the low-activity fayalite could be converted into iron, calcium silicate and iron oxide, thereby facilitating the improvement in the efficiency of the desulfurization and denitration of the flue gas and the hydration activity of the cementing material; moreover, the free oxygen contained in the phase regulator breaks the original silicon-oxygen network structure of the manganese slag under the condition of high temperature, so that the silicon-oxygen tetrahedron and manganese-oxygen octahedron network structure in the crystal is disintegrated to form a large number of broken bonds, which can stimulate the activity of the smelting industrial waste slag.

In the present invention, after obtaining the activated slag, the activated slag, the oxidant and water are mixed to obtain the slurry for desulfurization and denitration.

In the present invention, the oxidant preferably includes $KMnO_4$ or $NaClO_2$. In the present invention, there is no particular limitation to the water, and any water well known to those skilled in the art can be used. Specifically, the example of the water includes a deionized water and a tap water. In the present invention, the mass ratio of the activated slag to the oxidant is preferably 10:(0.3-0.8), more preferably 10:(0.4-0.7), and most preferably 10:0.5. In the present invention, the concentration of activated slag in the slurry is preferably 50 g/L. According to the present invention, after mixing the activated slag with water, the resulting mixed system is then mixed with the oxidant to obtain the slurry for desulfurization and denitration.

In the present invention, after obtaining the slurry, the slurry is then contacted with a flue gas to be treated such that the flue gas is subjected to desulfurization and denitration treatment to obtain the slurry containing sulfate and nitrate.

In the present invention, the volume concentration of $SO_2$, NO and $O_2$ in the flue gas each is preferably 300-1000 ppm, 200-500 ppm and 1-10%. In the present invention, the volume ratio of the slurry to the flue gas in the desulfurization and denitration treatment is preferably 1:(600-1000), and more preferably 1:(650-950). In the present invention, the temperature of the desulfurization and denitration treatment is preferably 30-45° C., and more preferably 32-43° C. and the time of the treatment is preferably 5-12 h, and more preferably 6-11 h. In the present invention, the flow rate of the flue gas in the desulfurization and denitration treatment is preferably 200-800 mL/min, more preferably 450-550 mL/min, and still more preferably 490-510 mL/min. In the present invention, the slurry is preferably contacted with the flue gas in a counter current manner.

In the present invention, the desulfurization and denitration treatment is preferably performed under a stirring condition; the stirring rate is preferably 1000-1200 rpm.

In the present invention, in the desulfurization and denitration treatment of the flue gas, the metal oxides, the metal ions and the oxidant in the slurry can react with $SO_2$, NO and $NO_2$ in the flue gas so as to oxidize and remove them. Specifically, if the oxidant is for example $KMnO_4$, the following reactions would be occurred:

$$SO_2(aq)+H_2O \leftrightarrow H^+ + HSO_3^- \leftrightarrow 2H^+ + SO_3^{2-},$$

$$SO_3^{2-} + MnO_4^- + H_2O \rightarrow SO_4^{2-} + MnO_4^{2-} + 2H^+,$$

$$HSO_3^{2-} + MnO_4^- + H_2O \rightarrow SO_4^{2-} + MnO_4^{2-} + 3H^+,$$

$$2SO_2 + O_2 + 2H_2O \xrightarrow{metalions} 2H_2SO_4,$$

$$NO + MnO_4^- \leftrightarrow NO_3^- + MnO_2,$$

$$CaMnO_3 + 2NO + H_2O \rightarrow Mn^{2+} + 2NO_2^- + Ca^{2+} + 2OH^-,$$

$$MnO_2 + 2NO \rightarrow Mn^{2+} + 2NO_2^-, \text{ and}$$

$$NO_2 + Mn^{2+} + 2H_2O \rightarrow NO_2^- + MnO(OH) + 3H^+.$$

According to the present invention, the flue gas is subjected to the desulfurization and denitration treatment so as to remove $SO_2$ and $NO_x$ in the flue gas.

In the present invention, the composition of the slurry containing sulfate and nitrate includes the ions in the liquid phase and the precipitation in the solid phase. The ions in the liquid phase comprise one or more of $Fe^{2+}$, $Fe^{3+}$, $Mn^{2+}$, $Zn^{2+}$, $Mg^{2+}$, $Ca^{2+}$, $Al^{3+}$, $SO_4^{2-}$, $NO_3^-$ and $NO_2^-$. The precipitation in the solid phase includes one or more of fayalite, potash feldspar, anorthite, high temperature quartz, calcium oxide, aluminum oxide, and magnesium oxide.

In the present invention, after obtaining the slurry containing sulfate and nitrate, the slurry containing sulfate and nitrate is subjected to solid-liquid separation to obtain a solid phase and a liquid phase, and the solid phase is then dried to obtain the cementing material.

In the present invention, there is no particular limitation to the method of solid-liquid separation, and any solid-liquid separation mode well known to a person skilled in the art can be used. In the present invention, the drying temperature is preferably 80-100° C., and more preferably 85-95° C.; the drying time is preferably 10-16 h, and more preferably 12-14 h. Preferably, after drying, the resulting dried product is crushed. In the present invention, there is no particular limitation to the crushing, and any means for crushing well known to those skilled in the art can be used. In the present invention, the cementing material has a particle size of 200-300 mesh.

The present invention preferably further comprises performing post-treatment on the liquid phase to recover Mn and/or Fe, respectively. In the present invention, the post-treatment preferably comprises sequential impurity removal and concentration. In the present invention, the impurities in the liquid phase include one or more of $Zn^{2+}$, $Mg^{2+}$, $Ca^{2+}$, and $Al^{3+}$. In the present invention, the impurity removal is preferably a purification impurity removal, and more preferably a precipitation filtration. In the present invention, the concentration is preferably evaporative concentration. In the present invention, the concentration is preferably effected to some extent that the concentration of manganese and iron salts which can be used in industry could be obtained. In the present invention, there is no particular limitation to the concentration of the manganese and the iron salts which can be used in industry, and the concentration of the manganese and the iron salt used in industry which is well known to a person skilled in the art can be used. After the post-treatment, the concentrated solution is preferably subjected to metal element recovery and extraction. In the present invention, there is no particular limitation to the recovery and extraction, and any method for a metal element recovery and extraction well known to those skilled in the art can be used.

Furthermore, the present invention provides an application of the cementing material obtained by the above technical scheme as a building material in the building field. In the present invention, the application is preferably to replace a part of cement powder with the cementing material for building construction.

In order to further illustrate the present invention, the method for preparing a cementing material using smelting industrial waste slag after utilizing the simultaneous removal of $SO_2$ and $NO_x$ in flue gas provided by the present invention will be described in more detail with reference to the following examples, but these examples should not be construed as limiting the scope of the present invention.

Example 1

The iron-manganese alloy slag was mixed with CaO in a mass ratio of 10:2, and then ground to 200-300 meshes. The resulting mixture was then placed in a crucible, heated to 900° C. by using a muffle furnace at a heating rate of 5° C./min, and kept warm for 120 min. The resulting mixture was then cooled to room temperature in the muffle furnace, and ground to 200-300 meshes to obtain an activated slag.

In a three-neck flask fixed on a constant-temperature magnetic stirrer, the obtained activated slag was mixed with water in a mass-to-volume ratio of 1 g:10 ml, and added with $KMnO_4$ in a mass ratio of the activated slag to an oxidant of 10:0.5 to obtain the slurry for desulfurization and denitration.

A simulated flue gas was prepared from a simulated flue gas system in which the concentration of $SO_2$ is 400 ppm, the concentration of NO is 300 ppm and the content of $O_2$ is 10%. The flue gas was introduced into a device filled with the slurry at a flow rate of 450 mL/min, and subjected to the desulfurization and denitration treatment in the device, wherein the gas concentrations at an inlet and an outlet of the device for the desulfurization and denitration treatment of the flue gas were detected by a flue gas analyzer, the concentrations of the Mn in a liquid phase and a solid phase were measured by using a flame method and XRF respectively, and the provided flue gas was subjected to the desulfurization and denitration treatment by using the obtained slurry under the conditions of stirring rotation speed of 1200 rpm and temperature of 30° C. to obtain a slurry containing sulfate and nitrate.

The slurry containing sulfate and nitrate was subjected to solid-liquid separation; the liquid phase was subjected to the purification impurity removal and evaporation concentration in sequence to recover Mn therein, and the solid phase was dried at 80° C. for 600 minutes and then crushed to 200 meshes to obtain the cementing material.

The components of the flue gas were detected by the flue gas analyzer, and the concentrations of Mn in the liquid phase and the solid phase were measured by the flame method and XRF, respectively. The results are shown in FIG. 1. As can be seen from FIG. 1, the desulfurization efficiency can be kept at 100%, the denitration efficiency is ≥60%, and the leaching rate of manganese is up to 86% within 600 minutes for the desulfurization and denitration treatment.

Test Example 1

The cementing material obtained in the example 1 was mixed with a cement in a mass ratio of 1:0.6 and mixed with water in a solid-liquid ratio of 1:0.5 in a cement paste mixer, and stirred for 3 minutes. The obtained slurry was poured into a mold, vibrated on a vibrating table for 50 times to make the slurry dense, scraped to make its surface flat, and then placed into a cement constant temperature and humidity curing box with the temperature of 20° C. and the relative humidity of 97% for 24 hours. After demolding, the slurry was continuously put into the curing box for curing for 28 days to obtain a cured body test block, which was subjected to compressive and flexural tests according to the standard GB/T 17671-1999. The test results are shown in table 1.

Example 2

The copper smelting slag was mixed with CaO in a mass ratio of 10:2, and then ground to 200-300 meshes. The resulting mixture was then placed in a crucible, heated to 900° C. by using a muffle furnace at a heating rate of 5° C./min and kept warm for 120 min. The resulting substance was then cooled to room temperature in the muffle furnace, and ground to 200-300 meshes to obtain an activated slag.

In a three-neck flask fixed on a constant-temperature magnetic stirrer, the obtained activated slag was mixed with water in a mass-to-volume ratio of 1:10, and added with $KMnO_4$ in a mass ratio of the activated slag to an oxidant of 10:0.5 to obtain the slurry for desulfurization and denitration.

A simulated flue gas was prepared from a simulated flue gas system in which the concentration of $SO_2$ is 400 ppm, the concentration of NO is 300 ppm and the content of $O_2$ is 10%. The flue gas was introduced into a device filled with the slurry at a flow rate of 450 mL/min, and subjected to the desulfurization and denitration treatment in the device, wherein the gas concentrations an inlet and an outlet of device for the desulfurization and denitration treatment of the flue gas were detected by a flue gas analyzer, the concentrations of Fe in a liquid phase and a solid phase were measured by using a flame method and XRF respectively, and the provided flue gas was subjected to the desulfurization and denitration treatment by using the obtained slurry under the conditions of stirring rotation speed of 1200 rpm and temperature of 30° C. to obtain a slurry containing sulfate and nitrate.

The slurry containing sulfate and nitrate was subjected to solid-liquid separation; the liquid phase was subjected to the purification impurity removal and evaporation concentration in sequence to recover Fe metal therein, and the solid phase was dried at 90° C. for 660 minutes and then crushed to 200 meshes to obtain the cementing material.

Figure 2:
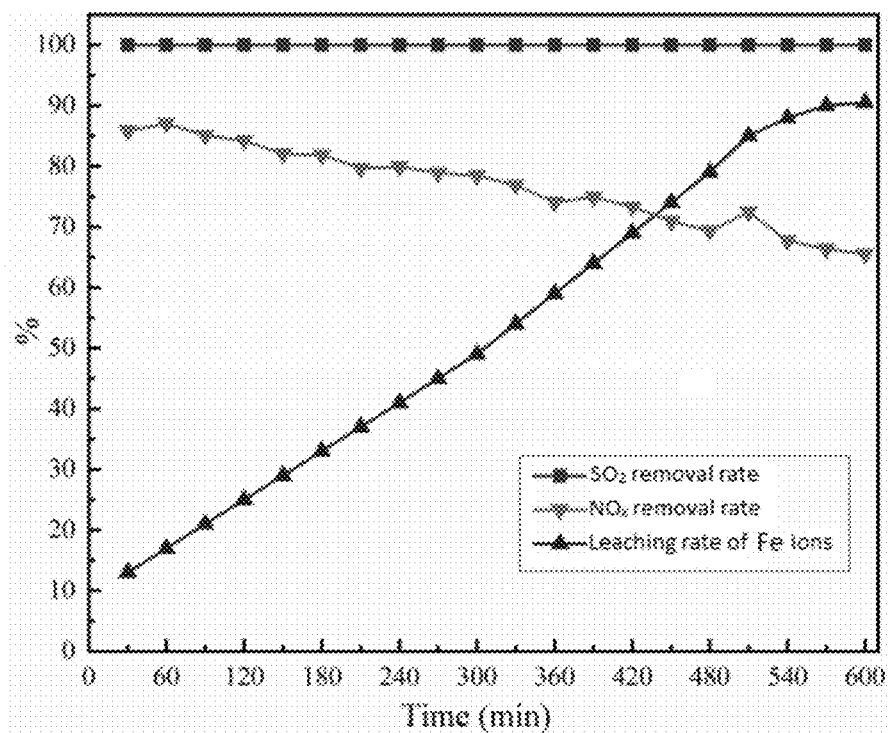
FIG. 2 is a graph showing the test results of the desulfurization and denitration treatment in Example 2.

The components of the flue gas were detected by the flue gas analyzer, and the concentrations of the Fe in the liquid phase and the solid phase were measured by the flame method and XRF, respectively. The results are shown in FIG. 2. As can be seen from FIG. 2, the desulfurization efficiency can be kept at 100%, the denitration efficiency is ≥65%, and the leaching rate of ion is up to 90% within 600 minutes for the desulfurization and denitration treatment.

Test Example 2

The cementing material obtained in the example 2 was mixed with a cement in a mass ratio of 1:0.6 and mixed with water in a solid-liquid ratio of 1:0.5 in a cement paste mixer, and stirred for 3 minutes. The obtained slurry was poured into a mold, vibrated on a vibrating table for 50 times to make the slurry dense, scraped to make its surface flat, and then placed into a cement constant temperature and humidity curing box with the temperature of 20° C. and the relative humidity of 97% for 24 hours. After demolding, the slurry was continuously put into the curing box for curing for 28 days to obtain a cured body test block, which was subjected to compressive and flexural tests according to the standard GB/T 17671-1999. The test results are shown in table 1.

Example 3

The copper smelting slag was mixed with the iron-manganese alloy slag in a mass ratio of 1:0.5, the resulting mixture was mixed with $Na_2CO_3$ in a mass ratio of 10:1, and then ground to 200-300 meshes. The total mixture was placed in a crucible, heated to 1000° C. by using a muffle furnace at a heating rate of 5° C./min and kept warm for 120 min. The resulting substance was then cooled to room temperature in the muffle furnace, and ground to 200-300 meshes to obtain an activated slag.

In a three-neck flask fixed on a constant-temperature magnetic stirrer, the obtained activated slag was mixed with water in a mass-to-volume ratio of 1:10, and added with $NaClO_2$ in a mass ratio of the activated slag to an oxidant of 10:0.6 to obtain the slurry for desulfurization and denitration.

a simulated flue gas was prepared from a simulated flue gas system in which the concentration of $SO_2$ is 800 ppm, the concentration of NO is 400 ppm and the content of $O_2$ is 8%. The flue gas was introduced into a device filled with the slurry at a flow rate of 550 mL/min, and subjected to the desulfurization and denitration treatment in the device, wherein the gas concentrations at an inlet and an outlet of the device for the desulfurization and denitration treatment of the flue gas were detected by a flue gas analyzer, the concentrations of Mn and Fe in a liquid phase and a solid phase were measured by using a flame method and XRF respectively, and the provided flue gas was subjected to the desulfurization and denitration treatment by using the obtained slurry under the conditions of stirring rotation speed of 1200 rpm and temperature of 45° C. to obtain a slurry containing sulfate and nitrate.

The slurry containing sulfate and nitrate was subjected to solid-liquid separation; the liquid phase was subjected to the purification impurity removal and evaporation concentration and the like to recover Fe and Mn therein, and the solid phase was dried at 80° C. for 660 minutes and then crushed to 200 meshes to obtain the cementing material.

Figure 3:
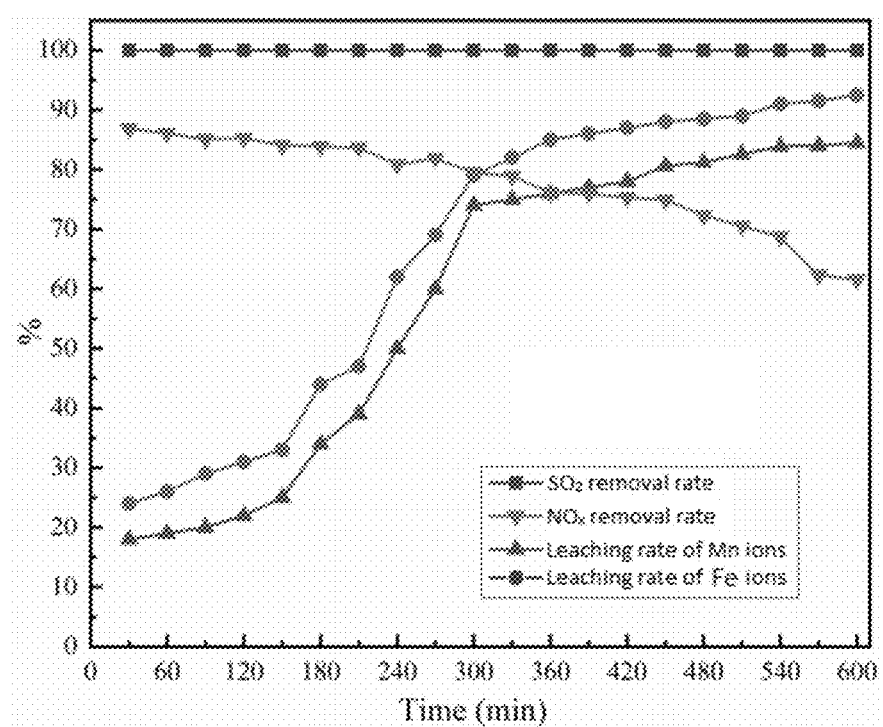
FIG. 3 is a graph showing the test results of the desulfurization and denitration treatment in Example 3.

The components of the flue gas were detected by the flue gas analyzer, and the concentrations of the Fe and Mn in the liquid phase and the solid phase were measured by the flame method and XRF, respectively. The results are shown in FIG. 3. As can be seen from FIG. 3, the desulfurization efficiency can be kept at 100%, the denitration efficiency is ≥60%, the leaching rate of manganese is up to 84%, and the leaching rate of iron is up to 92% within 600 minutes for the desulfurization and denitration treatment.

Test Example 3

The cementing material obtained in the example 3 was mixed with cement in a mass ratio of 1:0.6 and mixed with water in a solid-liquid ratio of 1:0.5 in a cement paste mixer, and stirred for 3 minutes. The obtained slurry was poured into a mold, vibrated on a vibrating table for 50 times to make the slurry dense, scraped to make its surface flat, and then placed into a cement constant temperature and humidity curing box with the temperature of 20° C. and the relative humidity of 97% for 24 hours. After demolding, the slurry was continuously put into the curing box for curing for 28 days to obtain a cured body test block, which was subjected to compressive and flexural tests according to the standard GB/T 17671-1999. The test results are shown in table 1.

TABLE 1

Compressive and flexural test results for test examples 1-3

| | 28-day flexural strength (MPa) | 28-day compressive strength (MPa) |
|---|---|---|
| Test Example 1 | 7.4 | 56.8 |
| Test Example 2 | 7.8 | 72.6 |
| Test Example 3 | 7.5 | 58.5 |
| Portland cement CA-50 | ≥6.8 | ≥54.2 |

As can be seen from Table 1, comparing the cementing materials prepared by using smelting industrial waste slag after utilizing the simultaneous removal of $SO_2$ and $NO_x$ in flue gas in the present invention with the portland cement CA-50, the inventive cementing materials have 28-day flexural strength and 28-day compressive strength which are meet the requirements of CA-50, and thus they have the use value of replacing the portland cement CA-50.

While the present invention has been particularly shown and described with reference to a preferred embodiment thereof, it will be understood by those skilled in the art that various improvements and retouches may be made therein without departing from the spirit and scope of the present invention.

What is claimed is:

1. A method for preparing a cementing material using smelting industrial waste slag after utilizing the simultaneous removal of $SO_2$ and $NO_x$ in flue gas, comprising the following steps:
   mixing the smelting industrial waste slag with a phase regulator to form a mixture, and then performing thermal activation pretreatment on the mixture to obtain an activated slag;
   mixing the activated slag, an oxidant and water to obtain the slurry for desulfurization and denitration;
   contacting the slurry with flue gas to be treated such that the flue gas is subjected to the desulfurization and denitration treatment to obtain a slurry containing sulfate and nitrate;
   performing solid-liquid separation on the slurry containing sulfate and nitrate to obtain a solid phase and a liquid phase; and
   drying the solid phase to obtain the cementing material;
   wherein the smelting industrial waste slag comprises ferromanganese alloy slag and/or copper smelting slag, and the phase regulator is CaO, $Na_2CO_3$ or $B_2O_3$,
   wherein the mass ratio of the smelting industrial waste slag to the phase regulator is 10:(1-3);
   wherein the thermal activation pretreatment comprises: sequentially performing first grinding, roasting and second grinding on the mixture, wherein the roasting temperature is 800-1200° C., and the roasting time is 60-180 minutes, and wherein the products obtained by the first grinding and the second grinding each independently has a particle size of 200-300 mesh.

2. The method of claim 1, wherein the oxidant comprises $KMnO_4$ or $NaClO_2$.

3. The method of claim 1, wherein the mass ratio of the activated slag to the oxidant is 10:(0.3-0.8), and the concentration of the activated slag in the slurry is 50 g/L.

4. The method of claim 2, wherein the mass ratio of the activated slag to the oxidant is 10:(0.3-0.8), and the concentration of the activated slag in the slurry is 50 g/L.

5. The method of claim 1, wherein the volume concentration of $SO_2$, NO and $O_2$ in the flue gas each is 300-1000 ppm, 200-500 ppm and 1-10%, and the flow rate of the flue gas is 200-800 mL/min.

6. The method of claim 1, wherein the volume ratio of the slurry to the flue gas in the desulfurization and denitration treatment is 1:(600-1000); the temperature of the desulfurization and denitration treatment is 30-45° C., and the time of the treatment is 5-12 h.

7. The method of claim 1, further comprising a post-treatment on the liquid phase, wherein the post-treatment comprises sequential impurity removal and concentration.

8. An application of the cementing material obtained by the method of claim 1 as a building material in the building field.

* * * * *